(12) United States Patent
Grills

(10) Patent No.: US 7,756,025 B1
(45) Date of Patent: Jul. 13, 2010

(54) METHOD, APPARATUS, NETWORK DEVICE AND COMPUTER PROGRAM FOR MONITORING OVERSUBSCRIPTION OF DATA TRAFFIC IN A COMMUNICATION NETWORK

(75) Inventor: Stephen William Grills, Belfast (GB)

(73) Assignee: Ciena Corporation, Linthicum, MD (US)

( * ) Notice: Subject to any disclaimer, the term of this patent is extended or adjusted under 35 U.S.C. 154(b) by 896 days.

(21) Appl. No.: 11/182,530

(22) Filed: Jul. 15, 2005

(51) Int. Cl.
*H04L 1/00* (2006.01)
(52) U.S. Cl. .................................... 370/230
(58) Field of Classification Search ................ None
See application file for complete search history.

(56) References Cited

U.S. PATENT DOCUMENTS

| | | | |
|---|---|---|---|
| 6,754,179 B1 * | 6/2004 | Lin | 370/235 |
| 7,299,277 B1 * | 11/2007 | Moran et al. | 709/224 |
| 2004/0252638 A1 * | 12/2004 | Gonzalez et al. | 370/229 |
| 2005/0182848 A1 * | 8/2005 | McNeil et al. | 709/235 |
| 2006/0045009 A1 * | 3/2006 | Madison et al. | 370/229 |

OTHER PUBLICATIONS

Wang et al, On Designing of EOS Chip with SDP, IEEE, 5 pages 2003.*

* cited by examiner

*Primary Examiner*—Frank Duong
(74) *Attorney, Agent, or Firm*—Christopher & Weisberg, P.A.

(57) ABSTRACT

A method, apparatus, network device and computer program for monitoring oversubscription of an Ethernet data service over a synchronous data communication link in which pause frames are used to control the bandwidth of a client with respect to a predetermined bandwidth of the communication link, the method comprising the step of recording the number of pause frames leaving the client network port.

14 Claims, 3 Drawing Sheets

METHOD, APPARATUS, NETWORK DEVICE AND COMPUTER PROGRAM FOR MONITORING OVERSUBSCRIPTION OF DATA TRAFFIC IN A COMMUNICATION NETWORK

FIELD OF THE INVENTION

The present invention relates to a method, apparatus and a computer program for monitoring oversubscription of a communication network, and more particularly Ethernet traffic over a fixed synchronous data communication link.

BACKGROUND OF THE INVENTION

The growth of corporate Internet traffic and inter-office applications using the Ethernet protocol, such as intranets, email, voice over IP and videoconferencing, has created challenges for service providers and operators of Metropolitan Area Networks (MANs) and Wide Area Networks (WANs). Furthermore, data networks are still not optimized to carry traditional telephony or real-time broadcast video applications efficiently.

Carriers are still relying on their extensive deployment of Synchronous Digital Network (SDN) rings to transport traffic in MANs. Consequently, synchronous data transmission over fiber optic networks continues to be the premier transport infrastructure in WANs and MANs.

SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU).

Carriers and enterprises need effective means of transporting Ethernet data over Synchronous Data (SD) networks. The most economical and least complicated solution to the problem of running Ethernet traffic over a SD network is through the deployment of interface converters. These devices offer simple connection between LANs and the access network to provide an Ethernet over SDN (EoSDN) solution.

EoSDN provides the scalable robust transport of Ethernet over a dedicated SDN link. Essentially, it seeks to overlay a 'bursty flexible' data service over a fixed SDN data pipe. However, this provides inherent issues not realised before with traditional SDN services. These issues include the inability to ascertain whether the SDN link is over/under subscribed by the applied data service.

SUMMARY OF THE INVENTION

According to an aspect of the invention, there is provided a method of monitoring oversubscription of Ethernet data services/traffic over a synchronous data communication link in which pause frames are used to control the bandwidth of a client with respect to a predetermined bandwidth of the communication link, the method comprising; recording the number of pause frames leaving the client network port.

The method can provide invaluable information to the service provider about the usage of the network link. Service providers could present this link usage data to their end customers in pursuit of securing higher grades of service and possibly augmenting the customers current bandwidth allocation.

The method may also empower the user to monitor the SD link usage. It also creates a sales opportunity to the provider wherein the user can be informed if they require more SDN bandwidth.

The method may also comprise the step of determining whether the number of pause frames leaving the client network port within a predetermined time period is above, or below, a predetermined threshold value. It may also further comprise the step of recording the number of times the number of pause frames leaving the client network port within a predetermined time period is sustained above, or below, a predetermined threshold value.

Thus, the service provider or user may be offered autonomy in determining tolerated oversubscription rate and periods. With this tool, service providers may create revenue opportunities and also control their current SDN allocation to Ethernet services.

According to another aspect of the invention, there is provided an apparatus for monitoring oversubscription of Ethernet data services over a synchronous data communication link in which pause frames are used to control the bandwidth of a client with respect to a predetermined bandwidth of the communication link, the apparatus comprising; a recording unit arranged to record the number of pause frames leaving a client network port.

The invention also provides a network device comprising apparatus as claimed in any of claims 7 through 14.

There is also provided a computer program comprising computer code means adapted to perform all the steps of any of claims 1 to 6 when said program is run on a computer.

BRIEF DESCRIPTION OF THE DRAWINGS

Embodiments of the invention will now be described, by way of example only, with reference to the following diagrams wherein.

DETAILED DESCRIPTION OF THE INVENTION

The use of Ethernet over Synchronous Digital Network (EoSDN) provides inherent issues not realised before with traditional SDN services. These issues include the inability to ascertain whether the SDN link is over/under subscribed by the applied data service. Having appreciated such problems, the present invention has been developed and is now to be further explained by way of describing various embodiments of the invention.

The invention provides a method of monitoring oversubscription of an EoSDN communication link, an example of which will now be described with reference to FIG. 1.

Figure 1:
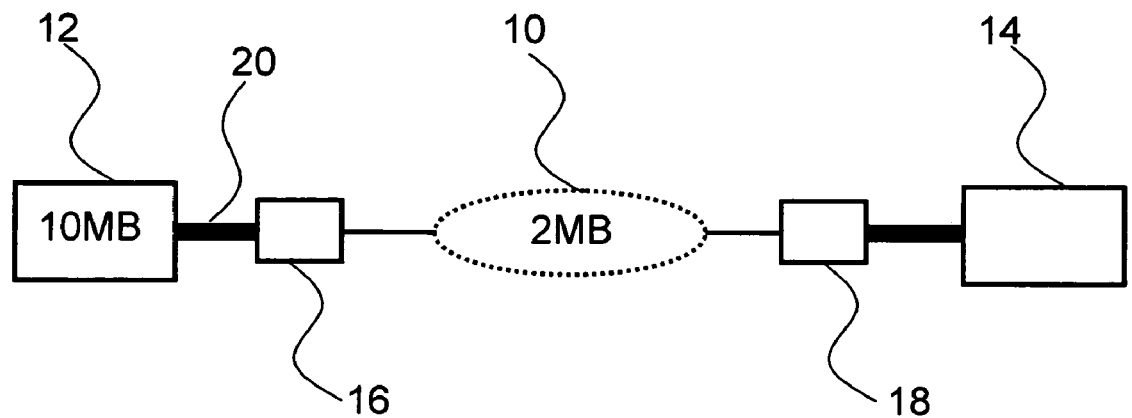
FIG. 1 is a diagram of an Ethernet over Synchronous Digital Hierarchy communication link including an apparatus for monitoring oversubscription according to an embodiment of the invention.

FIG. 1 shows an Ethernet over Synchronous Digital Network (EoSDN) communication link 10 connecting network clients 12,14. The network clients 12,14 are each connected to the EoSDN link via a network device 16,18.

The EoSDN communication link 10 is a VC-12 link with a 'line rate' of 2 megabits per second (2 Mbps). In reality, the actual available bandwidth, or 'payload rate', is lower than 'line rate' because a portion of the bits transferred over the link 10 are used for operations, administration, maintenance and provisioning capabilities. For purposes of this description however, it may be assumed that that the line rate of 2 Mbps is the available bandwidth for transferring data across the EoSDN communication link 10.

The client data link 20 between the network client 12 and the network device 16 is such that is has an available bandwidth of 10 Mbps. Thus, because the bandwidth of the client data link 20 is greater than that of the EoSDN link 10, the service is said to be 'over-subscribed' at the client port. In this example, there is an 8 Mbps disparity between the client data link 20 and the EoSDN link 10.

Because it is common for services to be over-subscribed in practice, there exist network devices with integrated flow control mechanisms for limiting the client bandwidth to a predetermined SDN circuit bandwidth. One such network device is the TN-1C EPL100 by Nortel Networks which uses Flow Control 802.3x Pause Frames to limit the client bandwidth. Referring back to FIG. 1, the network device 16 is a TN-1C EPL100.

By recording the number of the transmitted pause frames leaving the TN-1C EPL100 client LAN port, the invention enables the monitoring of the oversubscription of the EoSDN link 10.

The invention can integrate PAUSE frame recording into existing Performance Monitoring (PM) paradigms. This can be achieved by adding a new point to the existing Performance Monitoring Points (PMPs) that are monitored by the network device 16. For example, although PAUSE frames do not necessarily indicate an errored scenario, they may be recorded in existing PM counts such as the Errored Second (ES), Severely Errored Second (SES), and Unavailable Sustained (UAS) counts. Alternatively, any counting structure with correlated timing could be used for this purpose. Consequently, a number of parameters and features can be provided for the purpose of monitoring oversubscription, a number of which are now described.

Firstly, the number of times the service has been oversubscribed (but not sustained) during a monitoring time period is defined as the Over-Subscribed (OS) count.

A value for the acceptable number of pause frames during a defined period can also be defined, either by the client or the service provider. In other words, this is the threshold for determining an unacceptable oversubscription level and may be equal to or greater than the threshold rate for defining an OS occurrence. A Severely Over-Subscribed (SOS) count can then be defined to represent the number of times the service has exceeded the predetermined oversubscription threshold.

Further, the number of sustained occurrences of pause frames can be recorded as an Unavailable (UA) count in order to monitor a sustained period of oversubscription.

A Quality of Service Violation (QoSV) alarm can also be used to indicate the occurrence of a predetermined level of oversubscription and that more bandwidth is required. Various types and level of QoSV alarm may be defined according to different levels and periods of oversubscription. The alarm may also be of any such suitable form for indicating the occurrence of a QoSV and its corresponding attributes, for example it may be take the form of a message on a visual display, an audio alarm, or a message sent via email or SMS.

Configuration and viewing of the oversubscription statistics can also take the form of existing performance monitoring techniques employed by network devices, for example the provision of a client user-interface to display and configure real-time performance statistics and/or its history. The invention therefore empowers the user or service provider with the ability to monitor the SDN link usage and configure it to meet specific requirements.

Figure 2:
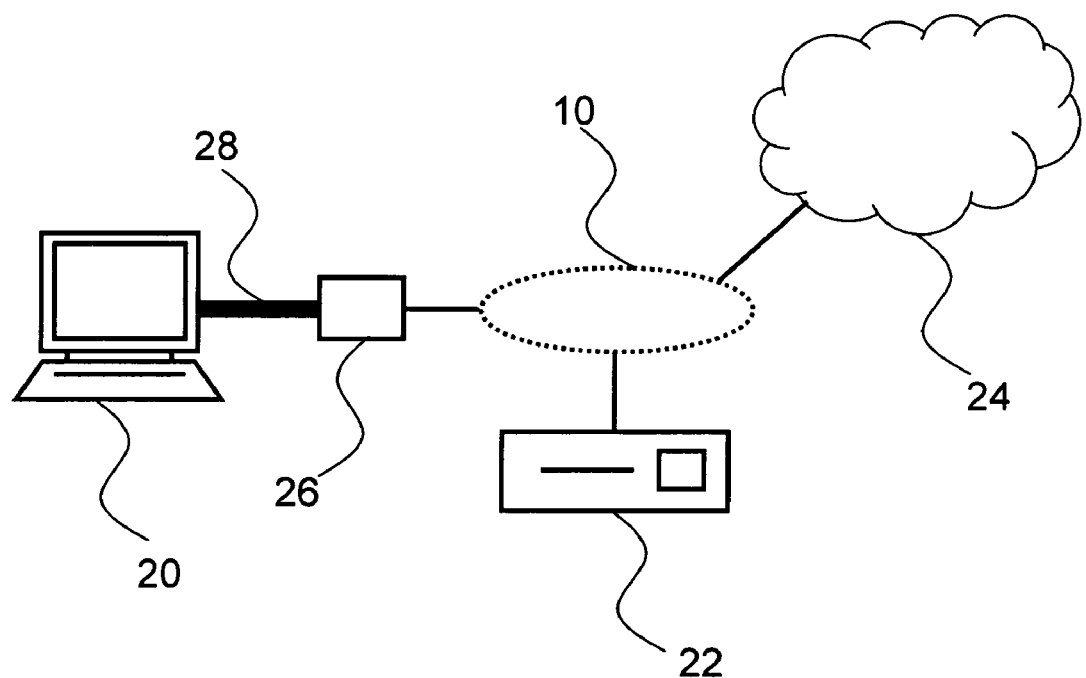
FIG. 2 is a diagram of an Ethernet over Synchronous Digital Hierarchy communication link including an apparatus for monitoring oversubscription according to an example of the invention.

Referring now to FIG. 2, an Ethernet over Synchronous Digital Network (EoSDN) communication link 10 connecting a network client 20, a server 22 and a WAN 24 is shown. The network client 20 is connected to the EoSDN link 10 via a TN-1C EPL100 network device 26.

The EoSDN link 10 is a VC-12 link with an available/allocated bandwidth of 2 Mbps. The client data link 28 between the network client 20 and the network device 26 is such that is has an available bandwidth of 10 Mbps. Thus, the service is 'over-subscribed' at the client port with an 8 Mbps disparity between the client data link 20 and the EoSDN link 10.

The network device 26 includes integrated PAUSE frame recording through the addition of a new point to the existing network PMPs and the occurrence of oversubscription is defined as the existence of 1 pause frame per second.

The threshold pause frame rate of an unacceptable oversubscription level is set by the client-user via a user-interface provided at the client-terminal. Alternatively, this threshold may be defined by the server 22 which contains a management platform by which the EoSDN link 10 can be managed or monitored by the service provider. In such a case, the server 22 would transmit a message to the network device 26 instructing the network device to set the unacceptable threshold pause frame rate to that defined by the server. Thus, the service provider, or even the user, can be offered autonomy in determining tolerated oversubscription rate and periods.

As the client 20 makes use of the EoSDN link 10, the link 10 may become oversubscribed. When oversubscription occurs, the flow control of the network device 26 will transmit pause frames from the client port in order to throttle/limit the client bandwidth. The rate at which these pause frames are transmitted are then recorded by the network device 26 and the respective OS, SOS and UA counts are also updated accordingly.

The counts may be monitored by the client-user via a graphic interface and/or stored in a suitable data memory space of the client 20. The server 22 may also monitor the counts in a similar way. However, to reduce data traffic in the EoSDN link 10, the server 22 may alternatively transmit periodic requests to the network device 26 in order to obtain the count information regarding oversubscription. The client 20 or server 22 may then control the allocation of the data services in response to the OS, SOS and UA counts that are provided.

When the pause frame rate is greater than a predetermined unacceptable level, the QoSV alarm mode in the network device 26 will be activated. At this time, the network device 26 indicates a QoSV to the client-user via a message displayed on the graphic interface of the client-terminal. The QoSV is also transmitted to the server 22 via the EoSDN link 10, whereby it is be stored in an appropriate data memory and/or displayed via a user interface. The QoSV alarm may be of any suitable format such that it communicates the necessary information, this may include the automatic transmission of messages via GSM or email and the updating of web pages.

An example of a method of monitoring oversubscription of the EoSDN communication link shown in FIG. 2 will now be described with reference to FIG. 3, wherein the steps of the method are indicated generally by 300.

Step 310 is a predefined process within existing TN-1C EPL100 network devices whereby Flow Control 802.3x Pause Frames are used to throttle/limit the client bandwidth to a predetermined value. When the network link 10 is oversubscribed, pause frames are transmitted from the EPL100 client LAN port.

If no pause frames are transmitted, the network link is under-subscribed. If the link remains under-subscribed for a predetermined period of time, a message may be transmitted to the client and/or the service provider indicating that the bandwidth of the network link could be reduced or re-allocated.

In step 320, the pause frame rate is monitored by the network device 26. This provides the OS count by recording the number of times the service has been oversubscribed (but not sustained) during a time period, for example the number of pause frames per second.

In step 330, it is determined whether the pause frame rate is greater than the predetermined threshold of unacceptable oversubscription. If the frame rate is below the predetermined threshold, the method reverts to and repeats step 320. If the frame rate is above the predetermined threshold, the EoSDN link 10 is oversubscribed at an unacceptable level and the method continues to step 340.

In step 340, a QoSV has occurred and this is recorded by incrementing the SOS count. Furthermore, the QoSV is indicated according to predetermined requirements. In this example, a message is displayed on the display of the client terminal and transmitted to the server 22 to inform the client user and service provider of the violation and its associated details.

Step 350 comprises the pause frame rate being monitored by the network device 26 and in step 360 it is again determined whether the pause frame rate is greater than the predetermined threshold of unacceptable oversubscription. If the frame rate is below the predetermined threshold, there no longer exists a QoSV and the method continues to step 380. If, in step 360, the frame rate is determined to be above the predetermined threshold, there exists a sustained occurrence of oversubscription at an unacceptable level and the method continues to step 370.

In step 370, the sustained period oversubscription is recorded by incrementing the UA count accordingly. Furthermore, the QoSV indication is updated with the corresponding details. The method then continues by reverting to and repeating step 350.

Step 380 comprises the removal of the QoSV indication since the EoSDN link 10 is no longer oversubscribed at an unacceptable level. The method then returns to step 320 to monitor the pause frame rate for oversubscription (but not sustained oversubscription).

In an alternative embodiment of the invention, step 370 further comprises indicating a sustained period of unacceptable oversubscription. For example, a new message is displayed on the display of the client terminal and transmitted to the server 22 to inform the client user and service provider of the sustained violation.

Figure 3:
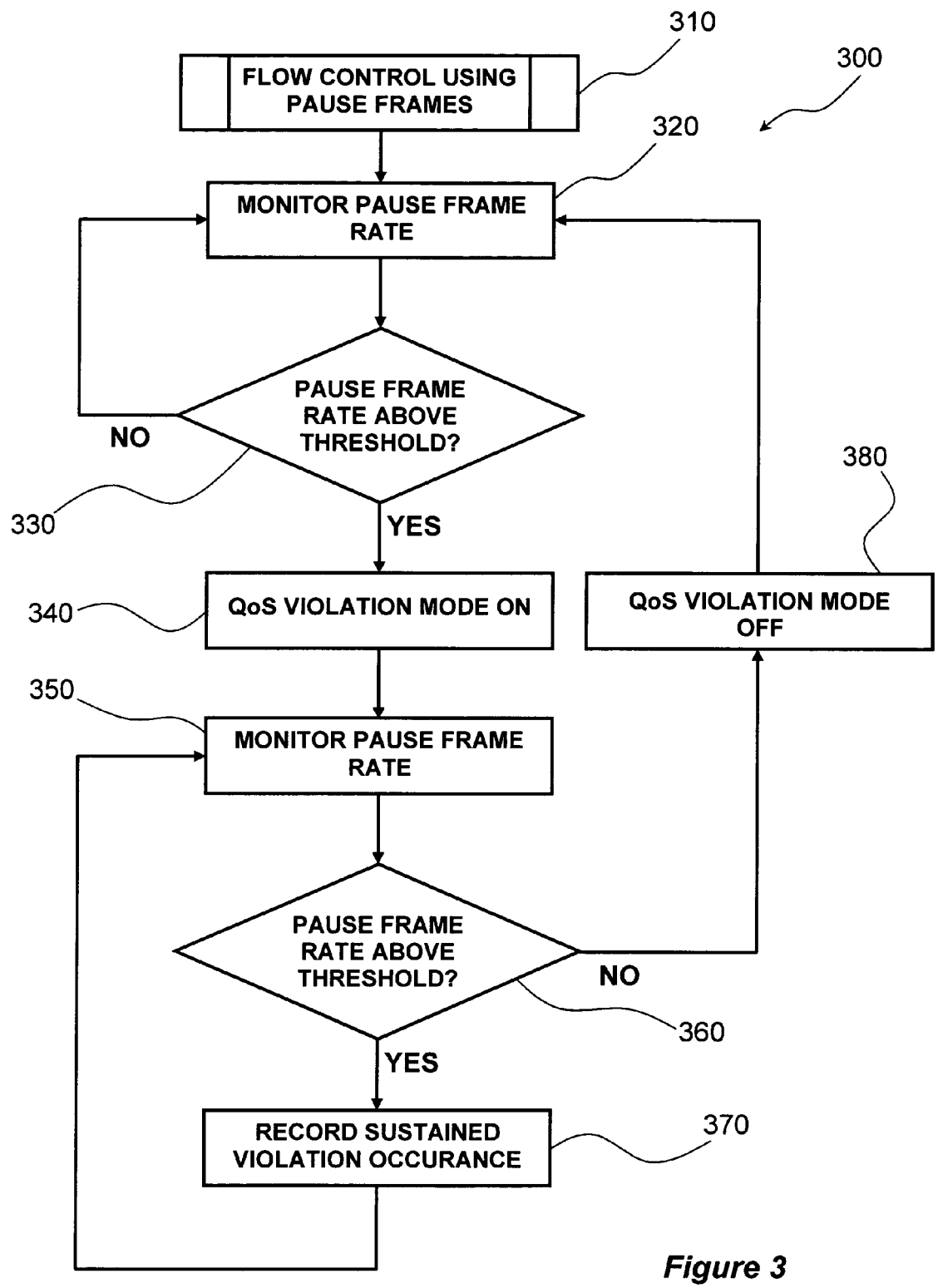
FIG. 3 is a flow diagram of a method of monitoring oversubscription of the Ethernet over Synchronous Digital Hierarchy communication link shown in FIG. 2.
Figure 4:
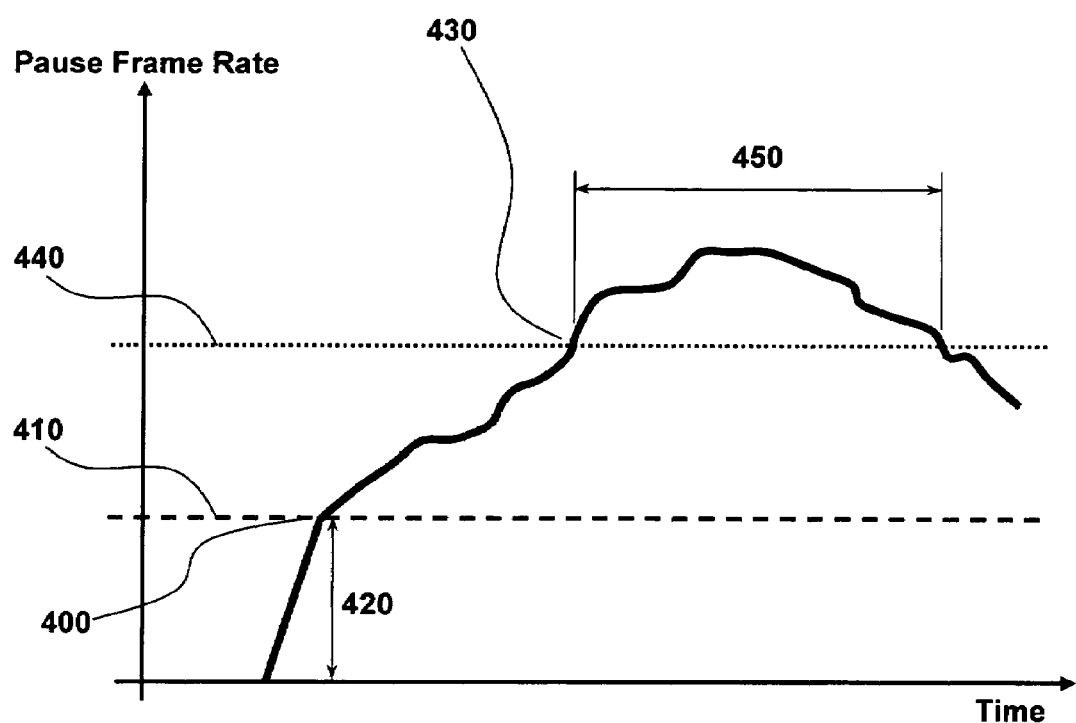
FIG. 4 is a graph illustrating an example of pause frame data used by the method shown in FIG. 3.

Referring to FIG. 4, a graph illustrating an example of pause frame data used by the method of FIG. 3 is shown. The communication link 10 is determined to be oversubscribed at 400 whereby the pause frame rate exceeds that of one frame per second (indicated by the horizontal dashed line 410). At pause frame rates below one pause frame per second, the communication link is undersubscribed as indicated by 420. At 430, the pause frame rate exceeds the predetermined threshold value (indicated by the horizontal dotted line 440) and the communication link 10 is oversubscribed at an unacceptable level. For the period of time that the frame rate is greater than the predetermined value there exists a sustained QoSV which is indicated by the arrow 450.

In alternative embodiments of the invention, additional parameters including the amount of oversubscription may be provisioned from the recording of the pause frame rate. Such information can be used to further inform the user or service provider of the communication link usage. Service providers could present this link usage data to their end customers in pursuit of securing higher grades of service and creating revenue opportunities.

The invention can also be used to provide automated control and management of the communication link through dynamic reallocation of service bandwidth and other provisions. Service providers can police their SDN allocation to Ethernet services and possibly augment the customer's current bandwidth allocation. Furthermore, the invention may suggest how much additional bandwidth a user requires to alleviate oversubscription based upon the oversubscription counts and the indicated degree of oversubscription.

Continued use of the invention may further provide information relating to the usage of the communication link with respect to time. Service providers may then identify patterns of oversubscription during specific time periods, such as a day, and the network management system could automatically alter the bandwidth to meet requirements during periods of high or low demand. Thus, a hitless increase/decrease of traffic can be achieved in conjunction with Link Capacity Adjustment Scheme (LCAS), which is a renowned SDH/SONET protocol.

The present invention may be implemented as a computer program used in conjunction with a network device that uses Flow Control 802.3x Pause Frames to limit client bandwidth. Thus, it may be implemented on a client 20 or a server 22 and adapted appropriately. Alternatively, it may be incorporated into network devices as apparatus or a computer program within the network device.

In a further alternative embodiment of the invention, the QoSV alarm may be 'latched' when activated so that it remains active for a predetermined period of time. During this time, the pause frame rate may be monitored and the QoSV indication updated with corresponding details.

It should be noted that the above-mentioned embodiments are presented purely by way of example and that numerous modifications and alterations may be realised by those skilled in the art while retaining the teachings of the invention.

For example, a QoSV mode may be activated and/or indicated only after the predetermined threshold frame rate has been exceeded for a sustained period of time.

The invention claimed is:

1. A method of monitoring oversubscription of Ethernet data services/traffic over a synchronous data communication link in which pause frames are used to control bandwidth of a client with respect to a predetermined bandwidth of the synchronous data communication link, the method comprising:
   recording a number of pause frames leaving a client network port;
   determining whether the number of pause frames leaving the client network port within a predetermined time period is above, or below, a predetermined threshold value; and
   recording a number of times the number of pause frames leaving the client network port within the predetermined time period is sustained above the predetermined threshold value.

2. A method as claimed in claim 1, the method further comprising:

communicating the number of pause frames leaving the client network port to the client.

3. A method as claimed in claim 1, the method further comprising:
communicating the number of pause frames leaving the client network port to a management platform.

4. A method as claimed in claim 1, the method further comprising:
indicating a quality of service violation if the number of pause frames leaving the client network port within the predetermined time period is above the predetermined threshold value.

5. A method as claimed in claim 4, wherein the quality of service violation is communicated to a management platform for the purpose of reporting network usage.

6. A method as claimed in claim 4, wherein the quality of service violation is communicated to a management platform for the purpose of augmenting network bandwidth allocation.

7. An apparatus for monitoring oversubscription of Ethernet data services over a synchronous data communication link comprising:
a flow control configured to transmit pause frames from a client network port to control a bandwidth of a client with respect to a predetermined bandwidth of the synchronous data communication link;
a recording unit arranged to record a number of pause frames leaving the client network port;
an oversubscription determining unit arranged to determine whether the number of pause frames leaving the client network port within a predetermined time period is above, or below, a predetermined threshold value; and
an oversubscription recording unit arranged to record a number of times the number of pause frames leaving the client network port within the predetermined time period is sustained above the predetermined threshold value.

8. The apparatus as claimed in claim 7, the apparatus further comprising:
a monitoring unit arranged to communicate the number of pause frames leaving the client network port to the client.

9. The apparatus as claimed in claim 7, the apparatus further comprising:
a monitoring unit arranged to communicate the number of pause frames leaving the client network port to a management platform.

10. An apparatus as claimed in claim 7, wherein the oversubscription recording unit is arranged to record the number of times the number of pause frames leaving the client network port within the predetermined time period is sustained below the predetermined threshold value.

11. An apparatus as claimed in claim 7, the apparatus further comprising:
a violation unit arranged to indicate a quality of service violation if the number of pause frames leaving the client network port within the predetermined time period is above the predetermined threshold value.

12. An apparatus as claimed in claim 11, arranged to communicate the quality of service violation to a management platform for the purpose of reporting network usage.

13. An apparatus as claimed in claim 11, arranged to communicate the quality of service violation to a management platform for the purpose of augmenting network bandwidth allocation.

14. A network device comprising a network interface port and apparatus as claimed in claim 7.

* * * * *